Patented Apr. 9, 1935

1,997,226

UNITED STATES PATENT OFFICE 1,997,226

CHLORINATION OF AROMATIC COMPOUNDS

Julius Mueller, Mannheim, Germany, assignor to General Aniline Works, Inc., New York, N. Y., a corporation of Delaware No Drawing. Application May 9, 1934, Serial No. 724,823. In Germany May 16, 1933

6 Claims. (Cl. 260—57)

The present invention relates to an improved method for the chlorination of aromatic compounds.

In the chlorination of organic compounds with elementary chlorine, the dosing or regulation of the amount of chlorine to be led in is frequently attended by difficulty, especially in cases in which several chlorination stages may be formed or in which the chlorine is not completely absorbed or in which there is no reaction by which the end of the chlorination may be detected. In such cases it is necessary to work up samples from time to time and to determine by analysis whether the desired degree of chlorination has been attained.

These operations require a long time and retard the finishing of each batch which, of course, is a considerable disadvantage in technical processes. Moreover, it is very difficult to stop the reaction just at the desired point and thus to obtain products containing exactly the desired proportion of chlorine.

I have now found that the chlorination of aromatic compounds may be carried out without the said difficulties and in a substantially shorter time by causing double the amount of chlorine which is to be introduced into the said aromatic compounds to act under increased pressure on the latter in a closed vessel, preferably while stirring, in the presence of such an amount of fuming sulphuric acid that the sulphuric anhydride present is sufficient to form chlorosulphonic acid with the hydrochloric acid which is formed in the reaction.

If, for example, 1 atomic proportion of chlorine is to be introduced into an aromatic compound, 1 molecular proportion of chlorine is introduced into a stirring autoclave containing the material to be chlorinated and such an amount of fuming sulphuric acid that the free sulphur trioxide present therein is sufficient to convert 1 molecular proportion of hydrogen chloride into chlorosulphonic acid.

The amount of chlorine to be introduced may be readily controlled, for example, by weighing the receptacle, for example the bomb, from which the chlorine is led into the reaction vessel. The increased pressure in the reaction vessel may be from about 1 to about 6 atmospheres corresponding to the pressure which, for example, is effected by the pressure of liquid chlorine contained in a bomb at room temperature.

As soon as the calculated amount of chlorine has been introduced into the reaction vessel the consumption of the chlorine can be controlled by watching the pressure in the reaction vessel. When the pressure has fallen to atmospheric pressure, it is usually necessary to allow the reaction mixture to remain still for some time under reaction conditions so that the last traces of chlorine, including the dissolved parts thereof, are used up. By a simple reaction the absence of free chlorine and the end of the reaction may be readily ascertained.

If desired, the process may also be combined with other operations, such as, for example, bromination, ring closure or purification of the reaction product by fractionation. It is advantageous in many cases to carry out the process in the presence of transferrers, preferably of iodine.

The following examples will further illustrate how my present invention may be carried out in practice, but the invention is not restricted to these examples. The parts are by weight.

Example 1

1 part of phthalic anhydride is dissolved in 10 parts of fuming sulphuric acid having an $SO_3$ content of 23 per cent in a pressure-tight vessel provided with a stirrer, 0.01 part of iodine is added and 0.972 part of chlorine is pressed in whereby the pressure rises to about 6 atmospheres while the temperature is gradually raised from 40° to 60° C. The reaction mixture is stirred for some time at the last mentioned temperature. When the pressure has fallen to atmospheric pressure, the reaction product is worked up in the usual manner. 3.6 dichlorphthalic anhydride is obtained in an excellent yield.

Example 2

1 part of 4'-aminobenzoyl-ortho-benzoic acid is dissolved in 20 parts of fuming sulphuric acid having an $SO_3$ content of 3.2 per cent in a pressure-tight vessel provided with a stirrer, and 0.6 part of chlorine is pressed in at a pressure of about 5 atmospheres, the temperature being kept at from 10° to 15° C. by external cooling. When the pressure has fallen to atmospheric pressure, the reaction product is added to 200 parts of water, filtered by suction, washed and dried. The sulphate of 3',5'-dichlor-4'-aminobenzoyl-orthobenzoic acid is obtained in a good yield.

Example 3

1 part of 4-methylbenzoyl-ortho-benzoic acid is introduced into 7 parts of fuming sulphuric acid containing 3 per cent of SO₃ in a pressure-tight vessel provided with a stirrer. The temperature is then raised to 110° C. during the course of an hour and then kept at from 110° to 115° C. for an hour. The mixture is allowed to cool, 1.2 parts of fuming sulphuric acid containing 23 per cent of SO₃ are added, 0.01 part of iodine is introduced and 0.3 part of chlorine pressed in in several batches under about 2 atmospheres at room temperature. When the chlorination is completed, the reaction product is poured into 70 parts of water and worked up in the usual manner. The chlorination product which is obtained in a good yield consists mainly of 1-chlor-2-methylanthraquinone and of small amounts of 2-chlor-3-methylanthraquinone. The chlorination is finished in a substantially shorter time than without pressure under otherwise the same conditions.

*Example 4*

1 part of pyranthrone is dissolved in 20 parts of fuming sulphuric acid containing 3.5 per cent of SO₃ in a pressure-tight vessel provided with a stirrer, 0.005 part of iodine is added and the calculated amount of chlorine for the formation of di-, tri- or tetra-chlorpyranthrone pressed in at room temperature. As soon as the pressure has fallen to amospheric pressure, the reaction is completed; then the reaction mixture is worked up in the usual manner. The dyestuff obtained dyes cotton from a violet vat orange shades, the color of which is more reddish with increasing chlorine content.

*Example 5*

1 part of pyranthrone is dissolved in 20 parts of fuming sulphuric acid having an SO₃ content of 3.5 per cent in a pressure-tight vessel provided with a stirrer. 0.197 part of bromine is allowed to flow in slowly during the course of 3 hours at room temperature. As soon as the bromine has been used up, 0.45 part of chlorine is pressed in the pressure rising to about 4 atmospheres. After the chlorine has been used up, i. e. the pressure has fallen to atmospheric pressure, the resulting dyestuff is worked up in the usual manner. Monobrom-dichlor-pyranthrone is obtained which dyes cotton from a violet vat clear red-orange shades. In this process the total amount of bromine used enters the pyranthrone without loss.

*Example 6*

1.2 parts of 1,1'-dinaphthyl-8-8'-dicarboxylic acid of 86.5 per cent purity are introduced at 60° C. into 10 parts of sulphuric acid monohydrate in a pressure-tight vessel provided with a stirrer and kept at from 60° to 65° C. for about an hour. After cooling to 20° C., 4.4 parts of fuming sulphuric acid containing 23 per cent of SO₃ and 0.01 part of iodine are introduced, 0.44 part of chlorine being then pressed in at about 4 atmospheres. When the chlorine has been used up, the reaction mixture is brought to a sulphuric acid content of from 85 to 90 per cent by the careful addition of water, the deposited sulphate of the resulting dyestuff filtered off by suction and washed with 85 per cent sulphuric acid. The residue is introduced into water, boiled, filtered by suction and the dyestuff formed by hydrolysis worked up in the usual manner. Dichlor-anthanthrone is obtained which dyes cotton orange shades from a violet vat.

*Example 7*

0.47 part of chlorine is pressed at from 10° to 15° C. into a solution of 1 part of dibenzanthrone in 17 parts of fuming sulphuric acid containing 3.25 per cent of SO₃ the pressure being about 4 atmospheres. After the chlorine has been absorbed, the reaction mixture is added to 170 parts of water and the dyestuff worked up in the usual manner. The dyestuff dyes cotton violet shades from a blue vat.

What I claim is:—

1. The process for the chlorination of aromatic compounds which comprises causing double the amount of chlorine which is to be introduced into the said aromatic compounds to act on the latter in a closed vessel under superatmospheric pressure in the presence of such an amount of fuming sulphuric acid that the sulphuric anhydride present is sufficient to form chlorosulphonic acid with the hydrochloric acid which is formed in the reaction and continuing the reaction until the pressure has fallen to atmospheric pressure.

2. The process for the chlorination of aromatic compounds which comprises causing double the amount of chlorine which is to be introduced into the said aromatic compounds to act on the latter in a closed vessel under a superatmospheric pressure of about 1 to about 6 atmospheres in the presence of such an amount of fuming sulphuric acid that the sulphuric anhydride present is sufficient to form chlorosulphonic acid with the hydrochloric acid which is formed in the reaction and continuing the reaction until the pressure has fallen to atmospheric pressure.

3. The process for the chlorination of aromatic compounds which comprises causing double the amount of chlorine which is to be introduced into the said aromatic compounds to act on the latter in a closed vessel under superatmospheric pressure in the presence of such an amount of fuming sulphuric acid that the sulphuric anhydride present is sufficient to form chlorosulphonic acid with the hydrochloric acid which is formed in the reaction and continuing the reaction until the pressure has fallen to atmospheric pressure, in which process a chlorine transferrer is employed.

4. The process for the chlorination of aromatic compounds which comprises causing double the amount of chlorine which is to be introduced into the said aromatic compounds to act on the latter in a closed vessel under superatmospheric pressure in the presence of such an amount of fuming sulphuric acid that the sulphuric anhydride present is sufficient to form chlorosulphonic acid with the hydrochloric acid which is formed in the reaction and continuing the reaction until the pressure has fallen to atmospheric pressure, in which process iodine is employed as chlorine transferrer.

5. The process for the chlorination of aromatic compounds which comprises causing double the amount of chlorine which is to be introduced into the said aromatic compounds to act on the latter in a closed vessel under superatmospheric pressure in the presence of such an amount of fuming sulphuric acid that the sulphuric anhydride present is sufficient to form chlorosulphonic acid with the hydrochloric acid which is formed in the reaction and continuing the reaction until the pressure has fallen to atmospheric pressure, which process is combined with the preparation of the material to be chlorinated.

6. A process for producing 1-chlor-2-methylanthraquinone which comprises treating 4-methylbenzoyl-ortho-benzoic acid with fuming sulphuric acid and then causing double the amount of chlorine which is to be introduced to act on the 2-methylanthraquinone formed in a closed vessel under superatmospheric pressure in the presence of such an amount of fuming sulphuric acid that the sulphuric anhydride present is sufficient to form chlorosulphonic acid with the hydrochloric acid which is formed in the reaction and continuing the reaction until the pressure has fallen to atmospheric pressure, in which process a chlorine transferrer is employed.

JULIUS MUELLER.